United States Patent
Schubert et al.

[15] 3,701,499
[45] Oct. 31, 1972

[54] ACTIVE FLUID ISOLATION SYSTEM

[72] Inventors: Dale W. Schubert, Sudbury; Frederick D. Ezekiel, Lexington, both of Mass.

[73] Assignee: Barry Wright Corporation, Watertown, Mass.

[22] Filed: April 8, 1968

[21] Appl. No.: 719,472

[52] U.S. Cl. ................ 244/17.27, 188/1 B, 248/20, 248/358
[51] Int. Cl. ............................................. B64c 27/04
[58] Field of Search......244/118, 776, 80, 83, 8, 122, 244/17.27; 188/1 B, 181 A; 248/20, 358

[56] References Cited

UNITED STATES PATENTS

| | | |
|---|---|---|
| 3,566,993 | 3/1971 | Leatherwood et al.........188/1 |
| 3,017,145 | 1/1962 | Yarber...................188/181 A |
| 3,464,657 | 9/1969 | Bullard.......................248/20 |
| 2,959,252 | 11/1960 | Jamieson....................188/1 B |
| 3,424,407 | 1/1969 | Garrard et al. ............244/118 |
| 2,767,942 | 10/1956 | Lucien........................244/83 |
| 2,898,538 | 8/1959 | Rafferty......................244/77 |
| 2,942,807 | 6/1960 | Gallagher....................244/80 |
| 3,424,407 | 1/1969 | Garrard et al. ............244/118 |

Primary Examiner—Milton Buchler
Assistant Examiner—Paul E. Sauberer
Attorney—Milton E. Gilbert

[57] ABSTRACT

A body to be stabilized, such as an aircraft pilot seat includes means, such as an accelerometer, for providing an acceleration signal representative of the acceleration of the body. This acceleration signal is used to control the action of a servovalve-controlled hydraulic actuator, to reduce the force applied to the body tending to reduce the acceleration sensed by the accelerometer to a substantially zero value. There is also a position transducer for providing a signal representative of the displacement of the body relative to the supporting structure position to provide a displacement control signal that controls the actuator so that the mass position is normally in a predetermined rest position, typically at the hydraulic actuator midposition.

21 Claims, 13 Drawing Figures

TRANSIENT RESPONSE OF ACTIVE ISOLATION SYSTEM

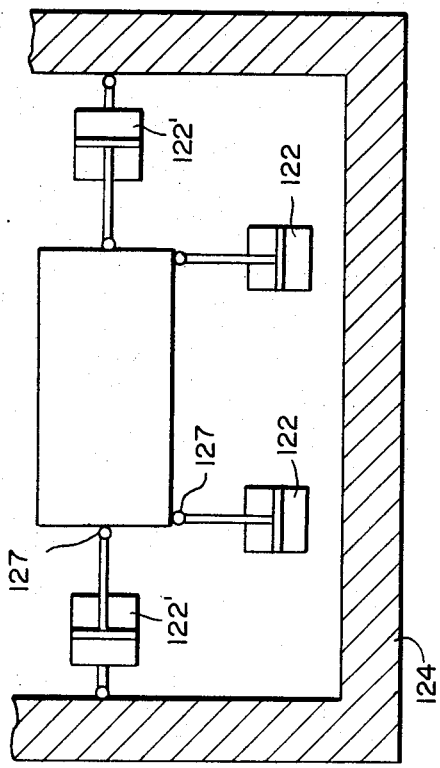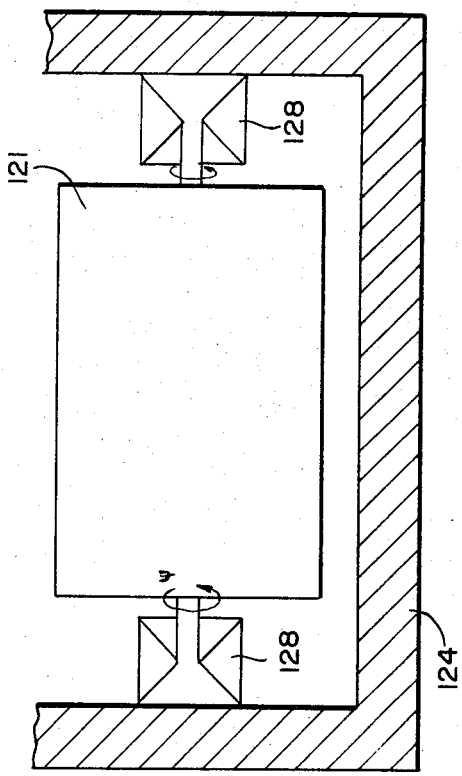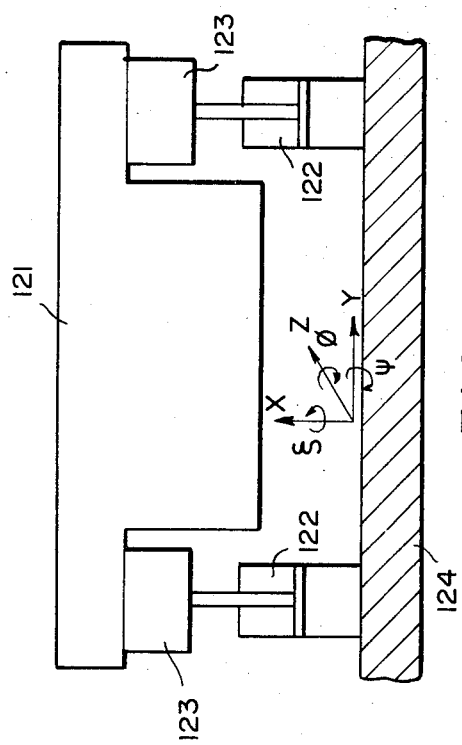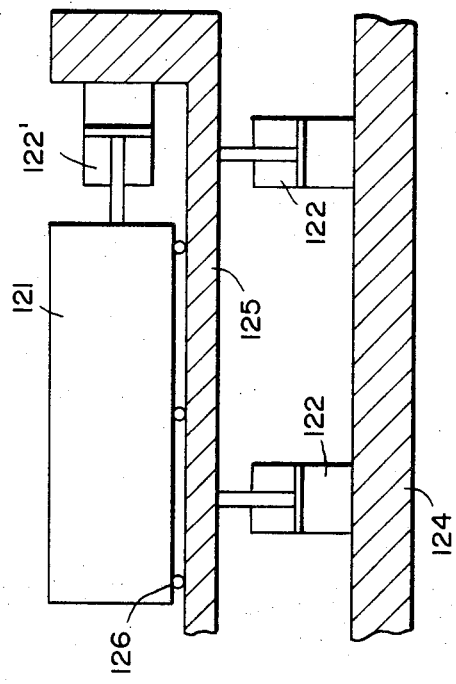

ACTIVE FLUID ISOLATION SYSTEM

BACKGROUND OF THE INVENTION

The present invention relates in general to shock and vibration-reduction systems and more particularly concerns novel apparatus for rapidly and continuously isolating a body from the effects of shock and vibration. An active hydraulic isolation system according to the invention facilitates isolating a body from the effects of both high-frequency and low-frequency vibration, whether it be broadband or discrete in nature.

There are two fundamental problems solved by the invention. The first is the problem of reducing the effects of shock and vibration in a moving platform, such as a pilot seat. The second is concerned with reducing the effect of shock and vibration upon a stationary structure supporting a vibrating machine, such as a building foundation supporting a punch press.

An active isolation system typically includes servomechanisms having excitations and/or response sensors, signal processors and actuators. The sensors provide signals related to dynamic excitation or response quantities. The signal processors modify and combine sensor signals to provide a command signal for controlling the actuators to act upon the body being isolated in accordance with the command signal. A major distinction between active and passive isolation systems is the application of external power to the active system.

Typical prior art active systems include force servos in combination with conventional passive isolators for reducing the shock and vibration experienced by a body to be isolated. The auxiliary force servo provides enough force to the supported platform to keep the passive isolator from being bottomed during conditions of sustained acceleration excitation so that the passive isolation system may function to reduce shock and vibration. With these types of systems active performance relies upon conventional passive means.

One example of a prior art active system that is an improvement over conventional passive isolation systems is a mechanopneumatic isolation system in which mechanical displacement feedback controls a flow of compressible gas to and from a double-acting actuator through a servovalve. See Cavanaugh U.S. Pat. No. 2,965,372 granted Dec. 20, 1960 for "Pneumatic Isolator." Displacement feedback actuation of the valve makes the actuator output force a function of the time integral of relative displacement so that no static deflection results from mass loading. Deflection during sustained acceleration conditions is reduced and eventually eliminated. Isolation from most vibration and shock is essentially provided by an effectively passive system in accordance with the low stiffness of the passive pneumatic actuator appropriately damped. The response of such a system to an acceleration step function is essentially that of a conventional passive system with an equal natural frequency, except that the magnitude of relative displacement is substantially reduced and eventually becomes zero. Because of the compressibility of the gas and the necessity of having relatively low gain, the speed of response of the mechanopneumatic isolation system is relatively slow. Because the vibration isolation of the mechanopneumatic system is essentially passive in nature, the isolation of low-frequency shock components and vibration becomes increasingly impractical as these frequencies decrease.

Another example of prior art active isolation systems is that described in Cavanaugh U.S. Pat. No. 3,310,263 granted Mar. 21, 1967 for "Gravity-sensitive Levelling."

Accordingly, it is an important object of this invention to actively isolate a body from the effects of undesired shock and vibration.

It is another important object of this invention to achieve the preceding object with great flexibility and over virtually any predetermined practical range of frequencies.

It is another object of the invention to achieve the preceding object with relatively compact reliably operating apparatus, even when the unwanted forces producing shock and vibration include very low-frequency spectral components.

Another object of the invention is to achieve the preceding objects with a system capable of providing vibration isolation in the presence of sustained external forces being applied to the isolated body.

A further object of the invention is to achieve one or more of the preceding objects with a system capable of handling sustained external forces while maintaining the isolated body essentially stationary relative to the actuator while tending to maintain the effective vibratory acceleration of the body substantially zero.

An important object of the invention is to provide an isolation system characterized by exceptionally high static stiffness to external forces directed upon the isolated body.

Still another object of the invention is to achieve the preceding object while providing much lower dynamic stiffness in the direction of and between the supporting structure and the isolated body so that the spring effect is unilateral as distinguished from the bilateral stiffness of a conventional spring element. That is to say, the dynamic stiffness between the supporting structure and the isolated body in the direction of the supporting structure is very high compared to that in the opposite direction.

It is still a further object of the invention to achieve one or more of the preceding objects with a system capable of being easily adapted to exhibit desired performance characteristics over wide ranges.

It is still a further object of the invention to achieve one or more of the preceding objects with a system capable of affording isolation from transient forces, shock and random vibration.

It is still a further object of the invention to achieve one or more of the preceding objects with a system that may embody elements that are electronics, mechanical, fluid or any combination thereof.

SUMMARY OF THE INVENTION

According to the invention, acceleration responsive means, such as an accelerometer or force load cell is associated with the body to be isolated for providing an acceleration signal representative of the acceleration of the body to be isolated. Controllable actuating means are associated with the body to be isolated for reducing the force applied to the body in response to at least the acceleration signal, thus tending to reduce the acceleration of the isolated body.

Preferably a system according to the invention also includes displacement-sensing means associated with the body for providing a displacement signal representative of the deviation of the body relative position from a predetermined normal relative position. The actuating means then also responds to this displacement signal so as to keep the body relative position essentially stationary.

Other systems according to the invention may also include one or more of relative acceleration, relative velocity, absolute velocity and absolute displacement sensing means associated with the body to be isolated.

The invention also embraces controlling a multiplicity of motion components, such as components along a number of lines of direction and rotational components with means including an appropriate array of translational and/or rotational sensors.

Numerous other features, objects and advantages of the invention will become apparent from the following specification when read in connection with the accompanying drawing in which:

BRIEF DESCRIPTION OF THE DRAWING

FIGS. 9, 10 and 11 show three arrangements of the invention for obtaining vibration isolation in more than one degree of freedom;

FIG. 12 shows a system providing isolation according to the invention from rotational disturbances.

DETAILED DESCRIPTION OF PREFERRED EMBODIMENTS

Figure 1:
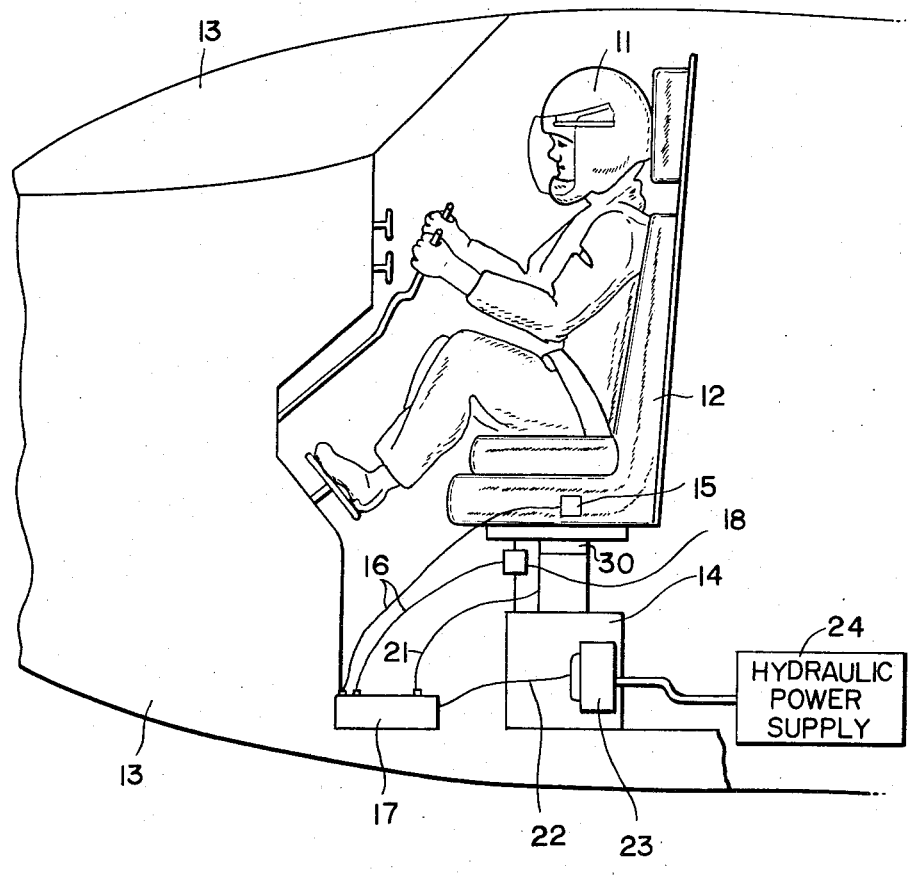
FIG. 1 is a combined block-pictorial representation of an active isolation system according to the invention especially useful for isolating an aircraft pilot.

Corresponding elements are usually identified by corresponding reference symbols throughout the drawing.

With reference now to the drawing and more particularly FIG. 1 thereof, there is shown a combined pictorial-block diagram representation of an active isolation system according to the invention for isolating an aircraft pilot 11 in pilot seat 12 from shock and vibration experienced by aircraft 13 in the course of flight by having hydraulic actuator 14 reduce the forces applied to pilot seat structure 12. In this specific case the pilot 11 and the pilot seat 12 represent the body to be isolated from shock and vibration according to the invention. Consideration of this specific application of the invention should facilitate comprehending the general applicability of the inventive concepts for effecting a high degree of isolation in a wide number of situations.

An accelerometer 15 senses the acceleration representative of the isolated body comprising the pilot 11 and the pilot seat 12 to provide an acceleration signal on line 16 to the input of servoamplifier 17. A position sensor 18 provides a signal over line 21 to servoamplifier 17 representative of the displacement of pilot seat structure 12 from a predetermined normal position, relative to the aircraft support structure 13.

The output of servoamplifier 17 provides a control signal on output line 22 for controlling the flow through servovalve 23 of fluid from hydraulic power supply 24 to actuator 14 so that the position of the pilot seat structure 12 remains essentially stationary relative to the aircraft structure and effectively isolated from the vibration and shock imposed upon the aircraft itself.

Figure 2:
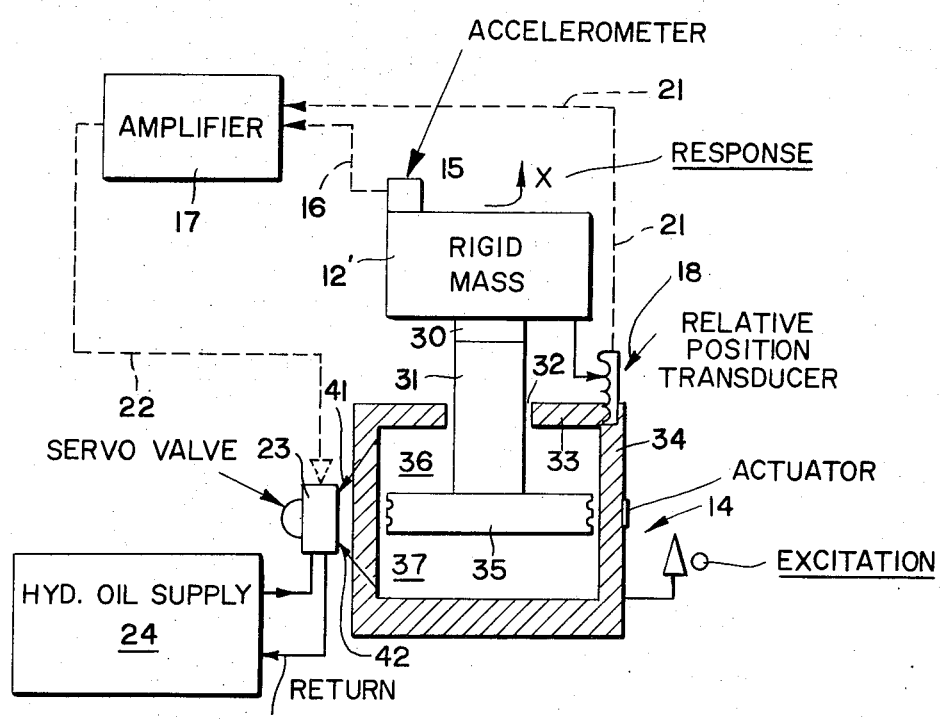
FIG. 2 is a schematic representation of a general electrohydraulic control system according to the invention.

Referring to FIG. 2 there is shown a combined block-diagrammatic representation of an electrohydraulic control system according to the invention of general applicability for isolation. Pilot 11 and seat structure 12 may correspond to the rigid mass 12'. Mass 12' may be coupled by coupling means 30 to a shaft 31 slidable through a fluidtight seal 32 in the top 33 of the cylindrical chamber 34 of actuator 14. Shaft 31 carries at its lower end piston 35 which divides the internal cavity defined by cylinder 34 into an upper chamber 36 and a lower chamber 37 communicating with servovalve 23 through upper line 41 and lower line 42, respectively. The difference between the pressure $P_1$ in upper chamber 36 and the pressure $P_2$ in lower chamber 37 determines the magnitude and sense of force applied on rigid mass 12' through shaft 31. Alternately shaft 31 could go through the bottom of chamber 34 of actuator 14.

Hydraulic power supply 24 provides hydraulic fluid into servovalve 23 for transmission through upper chamber 36 and lower chamber 37, fluid returning to hydraulic oil supply 24 over return line 43. When servovalve 23 controls the direction of flow so that it moves through upper line 41 into upper chamber 36, then flow from lower chamber 37 out through lower line 42, also results, and piston 35 imparts a downward velocity of mass 12' through coupling means 30 and shaft 31. When servovalve 23 controls the fluid flow in the opposite direction from bottom chamber 37 to upper chamber 36, piston 35 imparts an upward velocity to mass 12' through coupling means 30 and shaft 31. An advantage of the invention is that the hydraulic fluid flow can be controlled rapidly and slowly according to the conditions sensed to achieve effective load isolation in the presence of a wide range of disturbances.

Servoamplifier 17 combines the acceleration representative signal on line 16 provided by accelerometer 15 with the position indicative signal provided on line 21 by relative position transducer 18 to provide an output control signal on line 22 that operates servovalve 23 so that it controls the flow of hydraulic oil so as to keep the isolated mass 12' in essentially the same position relative to actuator 14 and relatively free of vibratory acceleration. In terms of what the invention does when used in the specific system of FIG. 1, the pilot 11 might ride through extremely bumpy air at very high speeds while experiencing an essentially smooth ride, even though the aircraft itself might be bouncing violently.

Coupling means 30 could be a continuation of shaft 31 for rigid connection with isolated mass 12'. However, coupling means 30 may be flexible and have the property of resiliently coupling low-frequency motion of shaft 31 to mass 12' while impeding the transfer of high-frequency vibration. Thus, coupling means 30 may effectively function as a passive low-pass mechanical filter.

Coupling means 30 has been discovered to have important practical advantages in an actual operating system. Degradation of the high-frequency vibration isolation characteristics may occur in systems without coupling means 30 when the excitation frequency approaches system resonant frequencies largely determined by the high stiffness characteristic of the hydraulic actuator 14, and the dynamics of the servovalve 23 and the servoamplifier 17. The closed-loop active isolation system resonant frequency is exceptionally low and has a hydraulic resonance in the high-frequency region where the transmissibility increases to a value of unity and greater, exhibiting isolation characteristics associated with a passive isolation system having a natural frequency dictated by the hydraulic resonance condition. The effect of coupling means 30 being flexible is to provide mechanical compensation, analagous to the electronic compensation in the servoamplifier, to reshape the frequency response characteristics in the region of the hydraulic resonance.

An on-off switch may be inserted in line 22 between servoamplifier 17 and servovalve 23 so that the system may be kept normally nonoperating and placed into operation immediately upon encountering conditions where stabilization is desirable.

Compensation networks typically include frequency-sensitive means for weighting one or more of the feedback signals and means for adjusting the gain imparted to respective signals. Examples of different types of compensation include compensation networks to minimize the effects of high-frequency hydraulic resonances to obtain improved isolation when the disturbances are caused by high-frequency vibration excitation. Compensation may also be devised to introduce a notch in the frequency response at any desired frequency to provide extremely high isolation efficiency (closely approaching 100 percent isolation) at one or several specific frequencies. The notch frequency may be adapted to a given environment or system response characteristic; for example, the notches may be arranged to track or be synchronized to an excitation or response.

The compensation and loop gains may be selected to effect a considerable reduction in the system resonant frequency to 0.01 Hz. and lower. Greater than 90 percent isolation of vibration can be provided for all frequencies greater than 0.1 Hz.

Still an alternate form of isolation may include multiple notch responses with the frequency of each notch being manually or automatically tunable to the fundamental and harmonics of a periodic vibration excitation, for example, to reject a high percentage of the excitation vibration of power source vibrations exhibiting predominantly periodic characteristics. This same type of application may be used to null out the vibration amplification effect of structural or mechanical system resonances.

Figure 3:
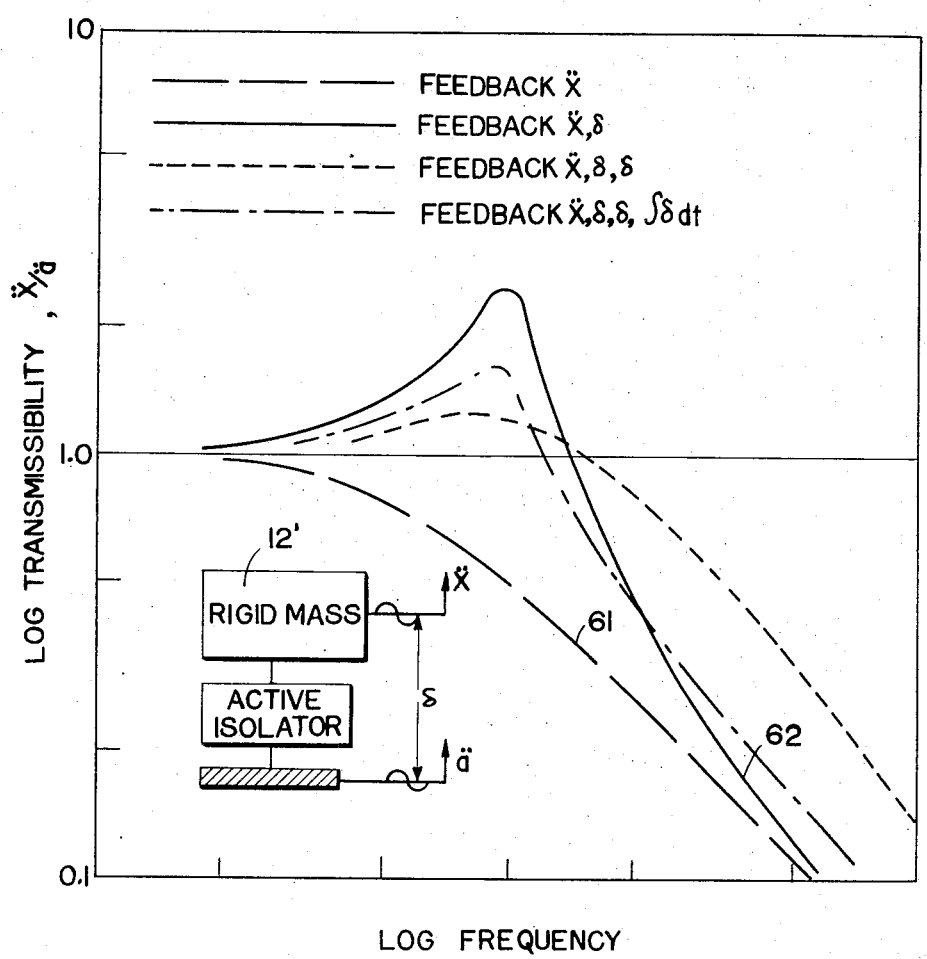
FIG. 3 is a graphical representation of transmissibility as a function of the frequency of excitation for various types of feedback signals.

Referring to FIG. 3, there is shown a graphical representation of transmissibility as a function of the frequency of excitation for various types of feedback signals. It is convenient to analyze the principles of operation in a single direction, designated the $x$ direction and use conventional notation to designate acceleration in this direction as $\ddot{x}$. It is also convenient to designate the displacement of the isolated body 12' considered to be a rigid mass relative to the supporting foundation as $\delta$, and its relative velocity as $\dot{\delta}$.

Figure 4:
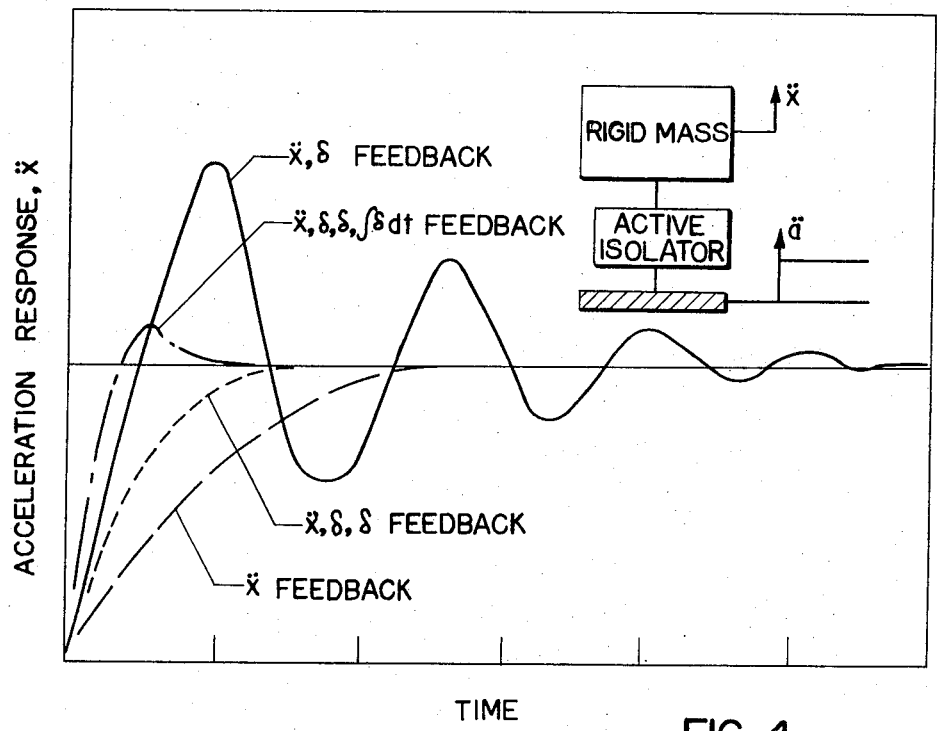
FIGS. 4 and 5 show acceleration and relative displacement responses, respectively, to a step acceleration input for the indicated forms of feedback.
Figure 5:
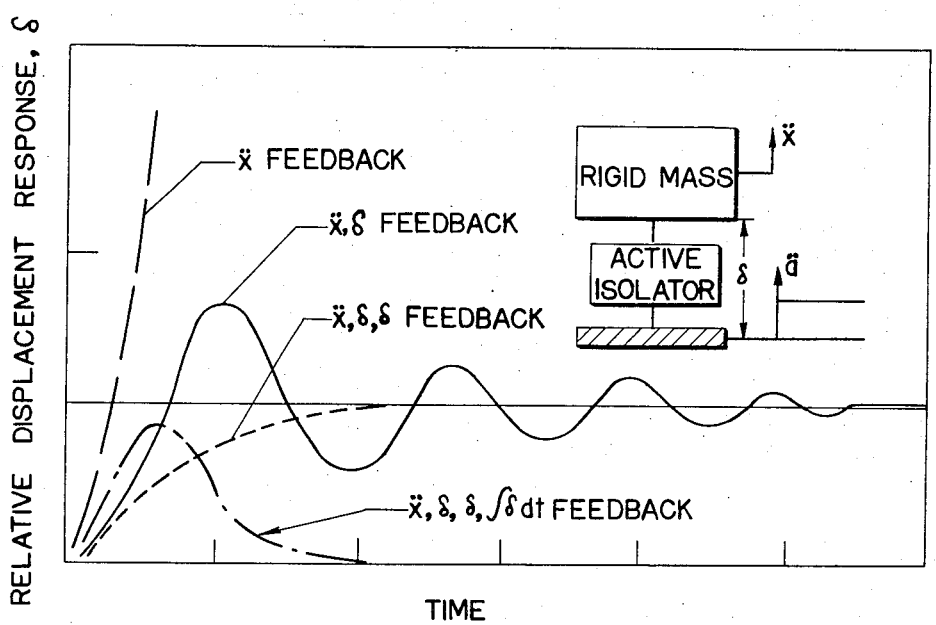

FIG. 4 and 5 show acceleration and relative displacement responses, respectively, to a step acceleration input for the indicated forms of feedback. FIG. 5 shows that acceleration feedback alone would result in considerable relative displacement while acceleration, velocity, displacement and time-integral of relative displacement feedback result in a small displacement for a very short time and, from FIG. 4, fast acceleration response with slight overshoot. By modifying the feedback signals in accordance with predetermined weighting functions, the response may be controlled as desired for the specific application.

Since the effective resonant-frequency-determining parameters are controlled electronically, the system resonant frequency may be established far lower than is practical to achieve with a passive system. Resonant frequencies as low as a small fraction of a Hertz are readily attainable with the invention.

The system thus includes means associated with the servoamplifier means for establishing the resonant frequency of the apparatus making up the system many times lower than the open loop resonant frequency of the apparatus with the servoamplifier means disconnected from the apparatus; that is, a passive system.

A novel characteristic of the invention is that the isolated mass looking toward the supporting structure encounters nearly infinite dynamic stiffness while the supporting structure looking toward the isolated mass encounters nearly zero stiffness. The isolated mass may thus be said to be supported by means having unilateral dynamic stiffness when the acceleration is sensed directly with means such as an accelerometer on the isolated body. When acceleration is sensed with means such as a load cell responsive to the force between relatively isolated body and support structure, the effective dynamic stiffness is bilateral.

The effect of time-integral of relative displacement feedback can be obtained by use of lead compensation in the acceleration feedback loop together with relative displacement feedback or by other electronic compensation means within the skill of one having ordinary skill in the servomechanism art. Its effect is to eliminate static deflection caused by load changes, decrease dynamic deflections and rapidly reduce deflections caused by sustained acceleration to zero that is to say, the system includes compensation means eliminating the response of the movable member to sensor signals corresponding to steady and very low frequency mass member response.

Figures 6, 7:
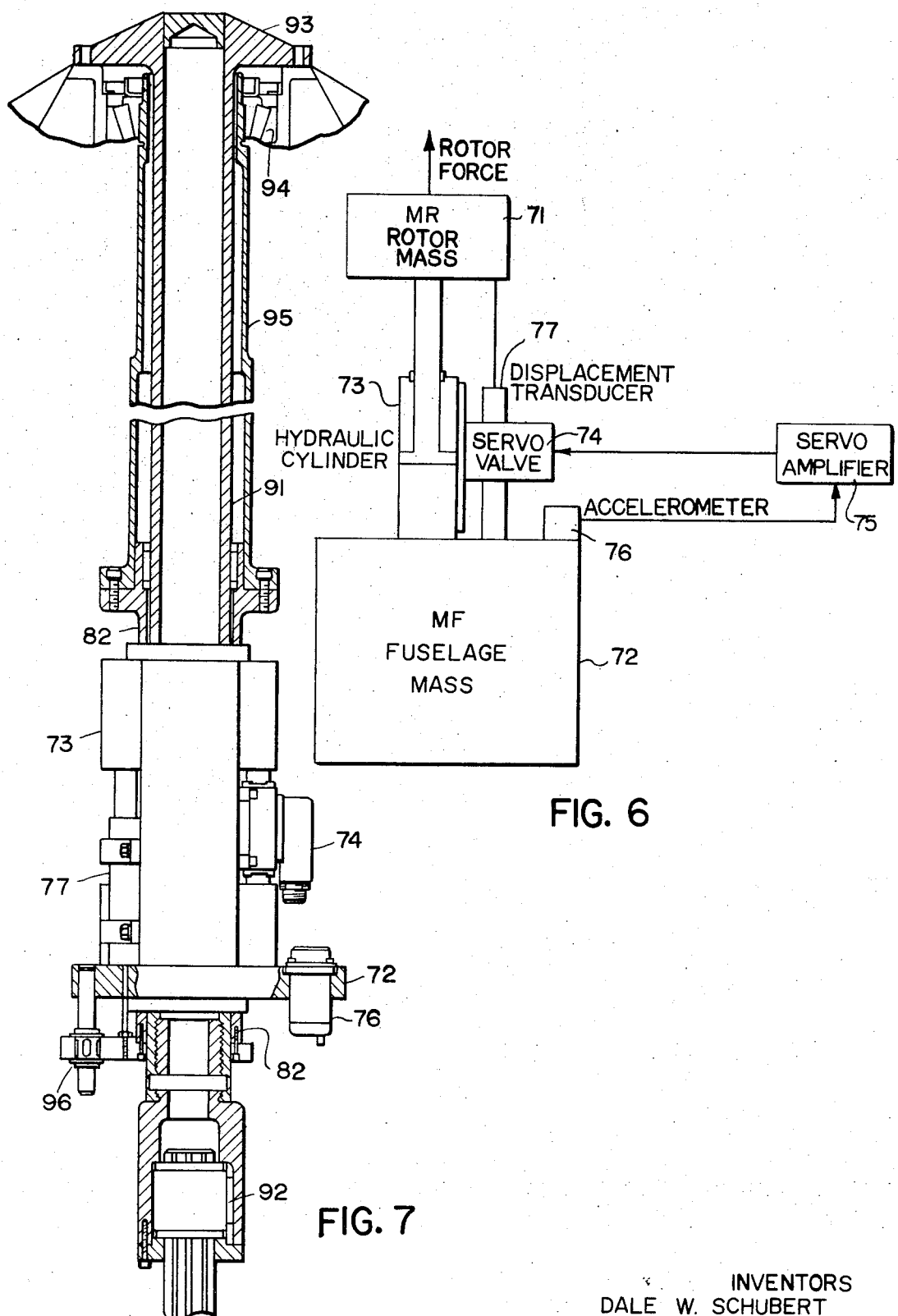
FIG. 6 is a block diagram illustrating the logical arrangement of a system according to the invention for effectively reducing the vibration and shock associated with a helicopter rotor.
FIG. 7 is a view, partially in section, of a suitable physical arrangement of an isolation system according to the invention between rotor and fuselage of a helicopter.

Referring to FIG. 6 there is shown a block diagram illustrating the logical arrangement of a system according to the invention for effectively reducing the vibration and shock associated with a helicopter rotor. The isolation system is placed between the rotor 71 and fuselage 72 of a helicopter and typically provides narrow bandwidths of isolation called notches. The notches of isolation are generally centered on the blade passage frequency and the first two harmonics of this frequency. The vibration isolation system comprises an hydraulic cylinder 73 placed in series with the force transmitting members between the rotor 71 and fuselage 72 of the helicopter. The hydraulic cylinder 73 is actuated by a flow control servovalve 74, which in turn is actuated by a servoamplifier 75. Two feedback signals are sent to the servoamplifier; one is an acceleration signal obtained from an accelerometer 76 attached to the fuselage 72 (on the cylinder, for example); the second, a relative displacement signal obtained from a displacement transducer 77 attached between the fuselage 72 and rotor 71 as (represented by the cylinder casing 81 and piston rod 82, respectively, for example). Hydraulic power is supplied to the servovalve 74 from a hydraulic power source (not shown).

The notches of vibration isolation are provided by electrical circuits in the servoamplifier placed in cascade with the acceleration feedback signal. A lead network also placed in cascade with the acceleration feedback in conjunction with the relative displacement feedback provides a system having no static deflection and small transient deflection of the fuselage relative to the rotor resulting from maneuver-transient accelerations of the helicopter.

Referring to FIG. 7 there is shown a view, partially in section, of a suitable physical arrangement of an isolation system according to the invention between rotor and fuselage. The double-acting hydraulic cylinder 73 having a hollow piston rod 82 is attached to the helicopter fuselage 72. The rotor shaft 91 is attached to the transmission by the spline 92 which allows relative motion to occur between the rotor hub assembly 93 and the fuselage 72, since such relative motion will result when vibration isolation is provided. The rotor shaft 91 passes up through the hollow piston rod 82 to the rotor hub assembly 93. The rotor shaft 91 provides the torque to rotate the rotor 71 (FIG. 6) which provides the lift forces to fly the helicopter. The lift forces are transmitted to the fuselage 72 through the thrust bearing 94, through the mast assembly 95 and into the piston rod 82. The piston rod 82 then transmits the lift forces to the piston and the piston transmits these forces to the fuselage through hydraulic pressures generated within the hydraulic cylinder chambers. The mast assembly is prevented from rotating by an antirotation mechanism 96. The flow control servovalve 74 regulates the flow to and from the upper and lower cylinder chambers of the hydraulic cylinder 73 in a manner proportional to the flow command signal applied to the valve from servoamplifier 75 (FIG. 6).

The signals from the accelerometer 76 and the displacement transducer 77 are fed to the servoamplifier 75 wherein they are first weighted in accordance with transfer functions of networks, then summed to generate the flow command signal delivered to the servovalve.

The flow of hydraulic fluid from the servovalve generates control forces and velocities which support the static load of the helicopter fuselage and at the same time provides for the isolation of the sinusoidal rotor induced forces at the blade passage frequency and its first two harmonics.

Figure 8:
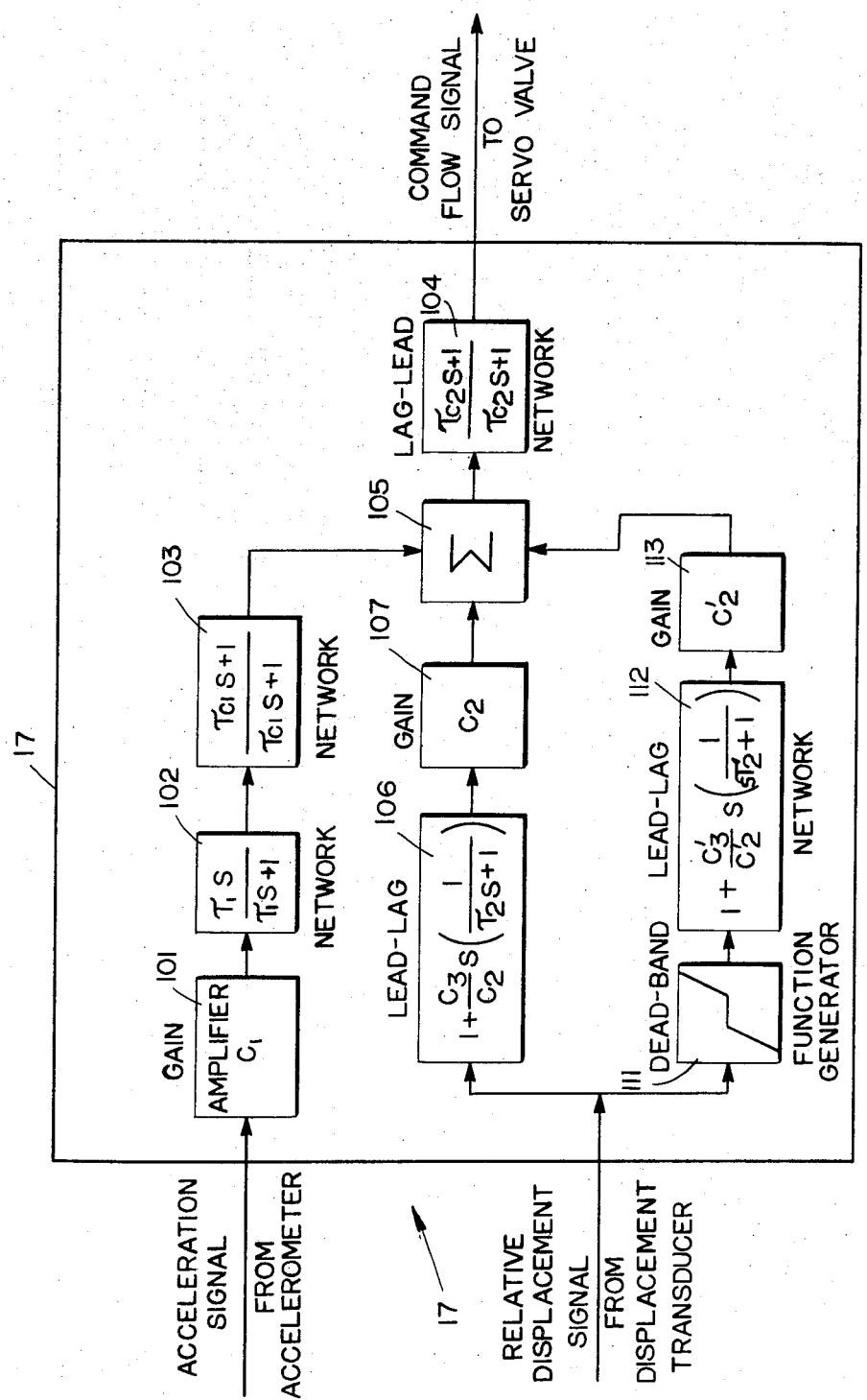
FIG. 8 is a block diagram illustrating the logical arrangement of a specific servoamplifier suitable for use in the pilot seat stabilization system of FIG. 1.

Those skilled in the servoamplifier art may apply known techniques in building a servoamplifier for a specific application. Referring to FIG. 8, there is shown a block diagram of a specific example of a servoamplifier suitable for use in the pilot seat stabilization system of FIG. 1. The signal from the accelerometer 15 is fed into the servoamplifier 17 wherein it is amplified by amplifier 101 to obtain the required acceleration gain $C_1$. The signal is then fed into two networks. The first network 102 is the lead network having the indicated transfer characteristic. The function of the circuit is to remove the DC components of the acceleration signal so that the isolation system will return to its null displacement position during the application of a sustained acceleration excitation.

The second network 103 is a standard lag-lead compensator having the transfer characteristic indicated (as shown, for example, in D'azzo and Houpas, Feedback Control System Analysis and Synthesis, page 438). The compensator 103 provides a reduced loop gain at high frequencies without the introduction of excessive lagging phase, thereby providing in conjunction with the second lag-lead compensator 104 having the transfer characteristic indicated a stable closed loop control system.

The acceleration signal after passing through the lag-lead compensator 103 is fed into a summation network 105, where it is added to the two displacement signals, processed in the manner described below, and then passed through the second lag-lead compensator 104 to provide the command flow signal. This compensator 104 is similar to compensator 103 and has the same function. The command flow signal is supplied to the servovalve 23 as a differential current signal generated by a small solid state amplifier (not shown).

The relative displacement signal from the displacement transducer 18 is fed into two circuits of the servoamplifier. The first circuit consists of a lead-lag compensator 106 with indicated transfer characteristic cascaded with an amplifier 107 with gain $C_2$. The lead-lag network 106 generates a signal proportional to the relative displacement plus the relative velocity signal. The function of this network is to provide the required relative displacement and relative velocity gains to obtain the desired linear operation of the closed-loop vibration isolation system.

The second displacement circuit consists of a diode function generator 111 having a "dead-band" characteristic, a lead-lag network 112 having the indicated transfer characteristic followed by an amplifier 113 with gain $C_2'$. The function generator provides a means of changing the relative displacement and relative velocity loop gain terms whenever the relative displacement exceeds a predetermined distance from its neutral position (actuator null position). The function of the second circuit is to provide more relative velocity and relative displacement gain during transient conditions, thereby limiting the maximum relative displacement to a much smaller magnitude than would have resulted without a circuit.

The outputs from the two displacement circuits are summed with the acceleration signal as described above.

There has been described above alternate ways of sensing acceleration by attaching the accelerometer to the isolated body. It is also possible to sense the force transmitted to the support structure through the isolator, or combinations of the above techniques. While only unidirectional single degree of freedom systems have been described above in detail, it is within the scope of the invention to apply the inventive concepts to multidirectional multidegree of freedom systems as is evident to those skilled in this art.

FIG. 9, 10 and 11 show three arrangements of the invention for obtaining vibration isolation in more than one degree of freedom. The electrohydraulic isolators are attached to the vibrating body 124. The electrohydraulic isolator is represented by the sketch of the hydraulic actuator.

Referring to FIG. 9, there is shown a system that provides vibration isolation by active means in the X and $\phi$ directions (where $\phi$ represents rotation in the X—Y plane), and passive isolation in the Y direction. The isolated body 121 is attached to the electrohydraulic isolator 122 through the passive isolator 123, which could in some cases be the flexible coupling member 30 of the active isolator. Vibration isolation in the Y direction is provided by the passive isolator 123. For such a system the isolation in the Y direction provided by the passive isolator will be poor compared to the active isolation in the X and $\phi$ directions. Thus, the application of this type of system is limited to cases where superior low-frequency isolation is required in the X and $\phi$ directions, and only moderate degree of isolation is required in the Y direction. The extension of this two-dimensional system to a three-dimensional system is accomplished by the addition of one or more additional electrohydraulic isolators and passive isolators located behind the two shown in FIG. 9. Such a system would yield active isolation in the X, $\phi$, and $\Psi$ (rotation in the X—Z plane) directions, and passive isolation in the Y, Z and $\xi$ (rotation in the Y—Z plane) directions.

Referring to FIG. 10, there is shown an alternate arrangement for providing active vibration isolation in the X, Y and $\phi$ directions. The isolated body 121 is attached to the actuator 122' providing vibration isolation in the Y direction. The isolated body rests upon the platform 125 by means of the rollers 126, or some comparable frictionless connection, such as an air or oil film. The function of the platform and rollers is to allow the isolator 122' to operate independently of the vertical isolators 122. The two vertical isolators 122 provide the vibration isolation in the X and $\phi$ directions as in FIG. 9. Vibration isolation in all six degrees of freedom may be obtained by the addition of a second platform isolator assembly.

Referring to FIG. 11, there is shown an arrangement for providing active vibration isolation in the X, Y and $\phi$ directions without the need for a secondary platform as used in FIG. 10. The isolated platform 121 is attached to the active isolators 122 and 122' via the ball joints 127. The function of the ball joints 127 is to allow for angular rotation of the actuators when motion along an axis normal to the axis of the isolator 122 occurs. The control functions for this system become much more complex than the previous two due to the requirements of coupling motion of orthogonal sets of isolators. However, the system of FIG. 11 offers a considerable weight reduction over that of FIG. 10. With additional isolators the system could provide active isolation in all six degrees of freedom.

Referring to FIG. 12, there is shown a system that provides active isolation in the $\Psi$ direction. The payload 121 is attached to two hydraulic actuators 128 that operate in the rotation $\Psi$ direction only. Such a system would use angular transducers for the generation of the $\Psi$ acceleration signal and the $\Psi-\beta$ relative displacement signal ($\beta$ represents the angular vibration of the vibrating object 124 in the $\Psi$ direction). Such a system is practical where vibration isolation in angular directions is required, such as in the case of isolation of aerial photographic equipment.

Figure 13:
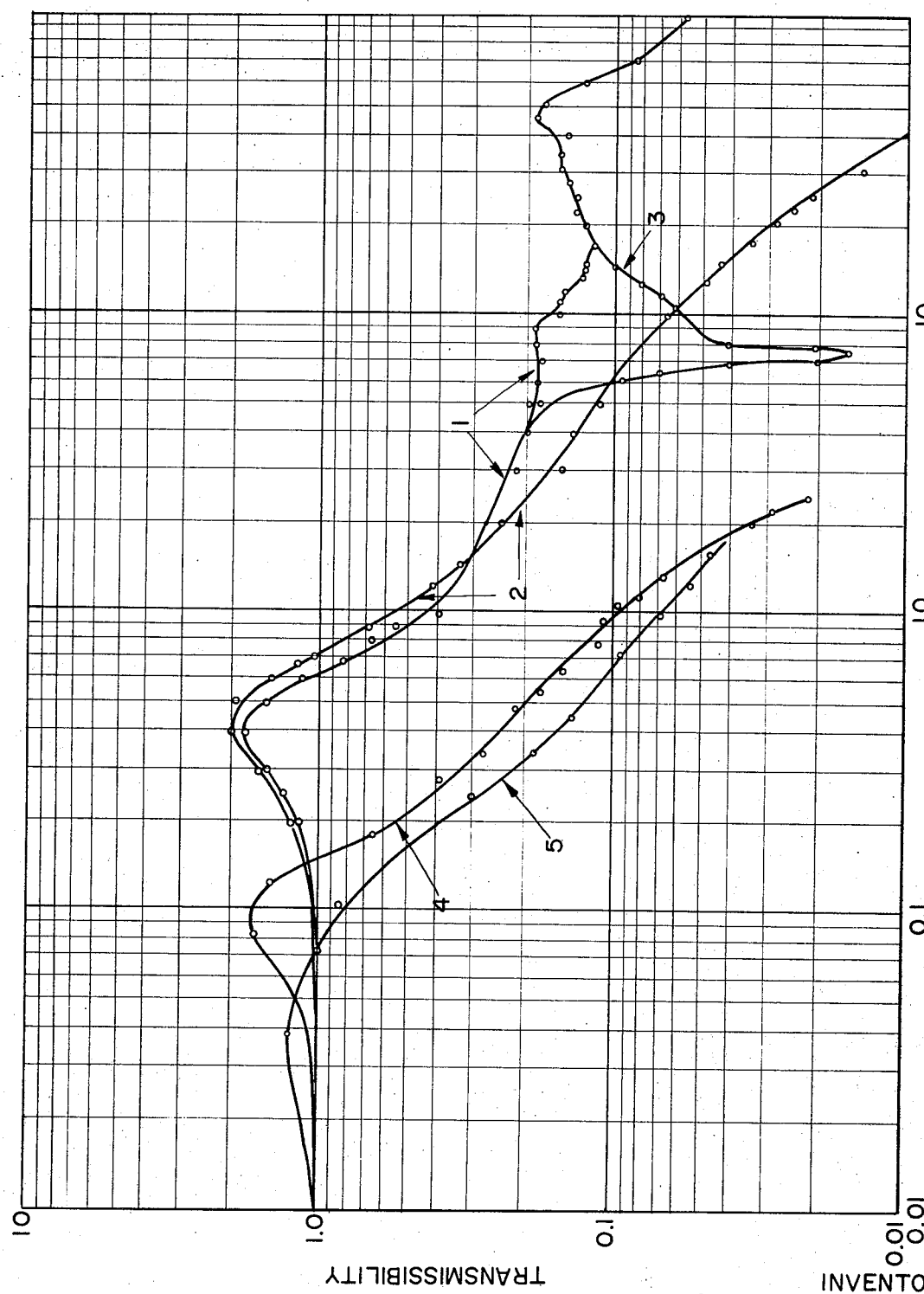
FIG. 13 shows measured plots of transmissibility curves of actual electrohydraulic vibration isolation systems according to the invention using various compensation schemes and feedback signal gain settings.

The invention has been practically realized. FIG. 13 shows plots of five transmissibility curves, 1–5, for the electrohydraulic vibration isolation system using various compensation schemes and feedback signal gain settings. The dots represent actual data, and the curves are drawn between the data points in a best-fit manner.

For curve 1 the payload was a rigid 210-lb. mass, and the system compensation consisted of an elastomeric isolator having a static stiffness of 5,500 lbs. per inch as the flexible coupling 30, and the two lag-lead compensators. The first compensator 103 of FIG. 8 had parameters $\tau_{c_1} = 0.1$ sec., and $\sigma_1 = 10$. The second 104 had parameters $\tau_{c_2} = 0.05$ sec., and $\sigma_2 = 10$.

For curve 2 the payload was the same, the compensation being different. The flexible coupling 30 was a helical spring having a stiffness of 370 lbs. per inch. The compensator 103 was a lag-lead network for which $\tau_{c_1} = 0.05$ and $\sigma_1 = 5$. The compensator 104 was a simple lag compensator ($\sigma_2 = \infty$) having a time constant $\tau_{c_2} = 0.0009$ sec. The added attenuation of the spring compensator at high frequencies (over that of the elastomeric isolator used for curve 1) provided a more stable system response which eliminated the 35-Hz. resonance of curve 1 and provided for a much larger degree of isolation for frequencies above 5 Hz.

Curve 3 was obtained by using the same system compensation and payload as used for curve 1 with the addition of a circuit having the transfer function $$\frac{e_{out}}{e_{in}} = \frac{\sqrt{2RCs}}{1+(RC)^2s^2/4}$$

in the acceleration feedback loop (between 102 and 103 of FIG. 8). For this curve the value of RC was 0.0425 sec. This circuit produces a very high gain at the frequency of the circuit resonance. This high gain causes the transmissibility to become small. Thus, the addition of this circuit resulted in the vibration isolation of curve 1 plus the addition of the notch of vibration isolation shown by curve 3.

Curve 4 is for a system where the payload was a rigid 210-lb. mass, and the compensation consisted of an elastomeric isolator having a static stiffness of 5,500 lbs. per inch as the flexible coupling 30, and the two lag-lead compensators. The first compensator 103 had parameters $\tau_{c_1} = 0.05$ sec., and $\sigma_1 = 20$. The second 104 had parameters $\tau_{c_2} = 0.05$ sec., and $\sigma_2 = 10$. The lower resonant frequency was obtained by increasing the acceleration gain of amplifier 101, increasing the time constant $\tau_1$ of network 102 and decreasing the displacement gain of amplifier 107 with respect to the values used for curve 1. The resulting system exhibited a very low resonant frequency of 0.1 Hz. and offered vibration isolation for excitation frequencies greater than 0.15 Hz.

Curve 5 is similar to curve 4, but has a lower resonant frequency and improved isolation of low frequency vibration isolation. For this curve the system payload was a rigid 210-lb. mass, and the compensation consisted of an elastomeric isolator having a static stiffness of 5,500 lbs. per inch as the flexible coupling 30, and three lag-lead compensators. The first compensator was 103, the second and third compensators corresponding to compensator 104. All three compensators had the same time constant and attenuation; $\tau_{c_1} = \tau_{c_2} = \tau_{c_3} = 0.1$ sec., and $\sigma_1 = \sigma_2 = \sigma_3 = 10$. Again, the lower resonant frequency was obtained by increasing the acceleration gain of amplifier 101, increasing the time constant $\tau_1$ of network 102 and decreasing the displacement gain of amplifier 107.

The static deflection of the active isolation system is zero. The advantages of the invention will be better appreciated by noting that the static deflection of a passive isolation system having comparable resonant frequencies would be approximately 4 feet for the system represented by curves 1, 2 and 3, 80 feet for the system represented by curve 4 and 525 feet for the system represented by curve 5'.

Some other applications for the invention include aircraft cabin isolation, cargo platform isolation for aircraft, ships, trains and land vehicles, aerial camera isolation, other vehicle seat isolation, shipboard crew ultralow-frequency isolators, blast shock isolation in air, on ground or under water, building isolation from vibrating equipment or earth dynamic disturbances, vibration test link, and in a human factors test device. These uses are by way of example only. Also numerous forms of feedback and sensors may be used in systems according to the invention.

There has been described an active isolation system capable of isolating selected elements from shock and vibration associated with various disturbances. The techniques afford great flexibility in economically, reliably and practically achieving a predetermined degree of isolation for a predetermined range of expected excitations. It is evident that those skilled in the art may now make numerous uses and modifications of and departures from the specific embodiments described herein without departing from the inventive concepts. Consequently, the invention is to be construed as embracing each and every novel feature and novel combination of features present in or possessed by the apparatus and techniques herein disclosed and limited solely by the spirit and scope of the appended claims.

We claim:

1. Active fluid isolation apparatus comprising, means defining a body to be isolated and remain in a stationary position relative to a reference,
   acceleration-responsive means placed on and attached to said body for providing an acceleration signal representative of the acceleration of said body,
   controllable actuating means outside said body responsive at least to said acceleration signal for acting upon said body so as to reduce the acceleration of said body,
   support means for carrying said controllable actuating means,
   position-responsive means for providing a displacement signal representative of the displacement of said body from said stationary position,
   and means for coupling said displacement signal to said controllable actuating means,
   said controllable actuating means also responding to said displacement signal for maintaining said body substantially in said stationary position.

2. Active fluid isolation apparatus in accordance with claim 1 wherein said reference is said support means.

3. Active fluid isolation apparatus in accordance with claim 1 wherein said controllable actuating means comprises,
   servovalve means having an actuator coupled to said body,
   power source means for providing fluid through said servovalve means to said actuator,
   servoamplifier means for processing at least said acceleration signal to provide a control signal,
   means for coupling said control signal to said servovalve to regulate the flow of said fluid through said servovalve for controlling said actuator at least in accordance with a predetermined function of said acceleration signal,
   said servoamplifier having means for establishing said predetermined function.

4. Active fluid isolation apparatus in accordance with claim 3 and further comprising,
   means including a flexible coupling for coupling said actuator to said body.

5. Active fluid isolation apparatus in accordance with claim 3 and further comprising,
   means for coupling said displacement signal to said servoamplifier means,
   said servoamplifier means having means for also processing said deflection signal in accordance with a predetermined weighting function to provide a component of said control signal.

6. Active fluid isolation apparatus in accordance with claim 3 and further comprising,
   means associated with said servoamplifier means for establishing the resonant frequency of said apparatus many times lower than the open-loop resonant frequency of said apparatus with said servoamplifier means disconnected from said apparatus.

7. Active fluid isolation apparatus in accordance with claim 5 and further comprising,
   means associated with said servoamplifier means for establishing the resonant frequency of said apparatus many times lower than the open-loop resonant frequency of said apparatus with said servoamplifier means disconnected from said apparatus.

8. Active fluid isolation apparatus in accordance with claim 5 and further comprising,
   means including a flexible coupling for coupling said actuator to said body.

9. Active fluid isolation apparatus in accordance with claim 6 and further comprising,
   means including a flexible coupling for coupling said actuator to said body.

10. Active fluid isolation apparatus in accordance with claim 3 wherein said means for establishing said predetermined function is characterized by a frequency response having at least one notch centered about a first notch frequency whereby signals of frequency very close to said first notch frequency applied to said servoamplifier means exercise much more influence on said control signal than signals of frequency further from said first notch frequency.

11. Active fluid isolation apparatus in accordance with claim 10 wherein said means for establishing said predetermined function is characterized by a frequency response having a plurality of notches centered about a corresponding plurality of respective harmonically related notch frequencies.

12. Active fluid isolation apparatus in accordance with claim 5 wherein at least one of said means for establishing said predetermined function and said means for processing said deflection signal is characterized by a frequency response having at least one notch centered about a first notch frequency whereby signals applied to said servoamplifier means of frequency very close to said first notch frequency exercise much more influence on said control signal than signals of frequency further from said first notch frequency.

13. Active fluid isolation apparatus in accordance with claim 12 wherein at least one of said means for establishing said predetermined function and said means for processing said deflection signal is characterized by a frequency response having a plurality of notches centered about a corresponding plurality of respective harmonically related notch frequencies.

14. Active fluid isolation apparatus in accordance with claim 13 wherein said support means comprises a rotor of a helicopter,
said mass comprises a fuselage of said helicopter,
and said notch frequencies are harmonically related to the frequency of rotation of said rotor.

15. Active fluid isolation apparatus in accordance with claim 5 and further comprising,
means including said controllable actuating means, said acceleration-responsive means and said servoamplifier means for establishing unilateral dynamic stiffness between said body and said support means for appreciably resisting relative displacement between said body and said support means caused by dynamic forces on said body while hardly resisting such relative displacement caused by dynamic forces on said support means.

16. Active fluid isolation apparatus in accordance with claim 3 wherein said acceleration-responsive means comprises a load cell,
said load cell, said servoamplifier means and said controllable actuating means comprising means for isolating said support means from vibration and shock produced by said body.

17. Active fluid isolation apparatus in accordance with claim 1 wherein said isolated body comprises a vehicle seat.

18. Active fluid isolation apparatus in accordance with claim 1 wherein said acceleration includes a rotational component.

19. Active fluid isolation apparatus in accordance with claim 1 wherein said acceleration includes a plurality of orthogonal components and further comprising,
means for independently reducing each of said components.

20. An isolator system to isolate a flexible body from disturbances causing objectionable movement of said flexible body comprising:
actuator means having a movable member connected to said flexible body mass, control means causing said actuator movable member to move to oppose responsive movement of said flexible body to disturbances;
said control means including means for applying a force to said movable member and including sensor means producing a signal corresponding to the movement of said mass member when said mass member responds to a disturbance and also including means for applying said force in response to said signal and in a manner indicated by said signal to oppose said movement; and
compensation means eliminating the response of said movable member to sensor signals corresponding to steady and very low frequency mass member response.

21. An isolator system to isolate a flexible body from disturbances causing objectionable movement of said flexible body comprising:
actuator means having a movable member connected to said flexible body mass, control means causing said actuator movable member to move to oppose responsive movement of said flexible body to disturbances;
said control means including means for applying a force to said movable member and including sensor means producing a signal corresponding to the movement of said mass member when said mass member responds to a disturbance and also including means for applying said force in response to said signal and in a manner indicated by said signal to oppose said movement; and
control loop means limiting the travel of said movable member to a predetermined constant maximum value.

* * * * *